United States Patent
Yamamoto et al.

(10) Patent No.: US 12,104,475 B2
(45) Date of Patent: Oct. 1, 2024

(54) HYDROCARBON RECOVERY METHOD AND HYDROCARBON RECOVERY SYSTEM

(71) Applicant: Japan Oil, Gas and Metals National Corporation, Tokyo (JP)

(72) Inventors: Koji Yamamoto, Tokyo (JP); Taku Oshima, Imizu (JP); Toshiro Hata, Hiroshima (JP); Jun Yoneda, Sapporo (JP)

(73) Assignee: JAPAN OIL, GAS AND METALS NATIONAL CORPORATION, Tokyo (JP)

( * ) Notice: Subject to any disclaimer, the term of this patent is extended or adjusted under 35 U.S.C. 154(b) by 201 days.

(21) Appl. No.: 17/860,175

(22) Filed: Jul. 8, 2022

(65) Prior Publication Data
US 2022/0341301 A1    Oct. 27, 2022

Related U.S. Application Data

(63) Continuation of application No. PCT/JP2021/001488, filed on Jan. 18, 2021.

(30) Foreign Application Priority Data

Mar. 9, 2020   (JP) ................ 2020-040256

(51) Int. Cl.
    *C09K 8/58*    (2006.01)
    *C09K 8/582*   (2006.01)
    *E21B 43/16*   (2006.01)

(52) U.S. Cl.
    CPC .............. *E21B 43/16* (2013.01); *C09K 8/582* (2013.01)

(58) Field of Classification Search
    CPC ........ E21B 43/16; E21B 43/267; E21B 43/04; E21B 43/20; E21B 43/162; E21B 43/164;
    (Continued)

(56) References Cited

U.S. PATENT DOCUMENTS 3,084,743 A * 4/1963 West ............... E21B 43/164
                                                    166/402
4,296,203 A   10/1981 Wernau
(Continued)

FOREIGN PATENT DOCUMENTS

CN   103562340 A   2/2014
CN   108457242 A   8/2018
(Continued)

OTHER PUBLICATIONS

International Search Report, Date of mailing: Apr. 13, 2021, 2 pages.
(Continued)

*Primary Examiner* — Edwin J Toledo-Duran
(74) *Attorney, Agent, or Firm* — Rankin, Hill & Clark LLP

(57) ABSTRACT

A hydrocarbon recovery method for recovering a production fluid containing hydrocarbons from a production well provided in the ground in which Type 1 microorganisms that produce a biological membrane (biofilm) and Type 2 microorganisms that produce carbon dioxide for promoting deposition of calcium carbonate exist, the hydrocarbon recovery method includes injecting, into the production well, a culture medium for increasing the Type 1 microorganisms; injecting, into the production well, a composition used for the Type 2 microorganisms to produce carbon dioxide, decompressing an inside of the production well after the culture medium and the composition are injected, and recovering the hydrocarbons in a state where the inside of the production well is decompressed.

10 Claims, 6 Drawing Sheets

(58) Field of Classification Search
CPC ........ C09K 8/582; C09K 8/584; C09K 8/426; C09K 8/68; C09K 8/80; C09K 8/487; C09K 8/572; C09K 8/74; C09K 8/46; C09K 8/575; C09K 8/62; C09K 8/72; C09K 8/58; C04B 28/10; C04B 14/06; C04B 14/22; C04B 14/28; C04B 14/30; C04B 18/141; C04B 18/16; C04B 22/085; C04B 22/124; C04B 22/128; C04B 24/126; C04B 2103/0001; Y02W 30/91
See application file for complete search history.

(56) References Cited

U.S. PATENT DOCUMENTS

| | | | | |
|---|---|---|---|---|
| 5,738,498 | A * | 4/1998 | Allington | B01D 11/0407 417/372 |
| 6,758,270 | B1 * | 7/2004 | Sunde | C09K 8/905 166/305.1 |
| 9,683,162 | B2 | 6/2017 | Ravnas | |
| 10,138,409 | B2 | 11/2018 | Ravnas | |
| 2004/0120853 | A1 * | 6/2004 | Carpenter | C09K 8/58 166/305.1 |
| 2006/0254765 | A1 * | 11/2006 | Pfeiffer | E21B 43/25 166/252.3 |
| 2007/0251146 | A1 * | 11/2007 | Larter | C09K 8/582 48/127.5 |
| 2007/0298479 | A1 * | 12/2007 | Larter | B09C 1/10 435/168 |
| 2008/0167445 | A1 * | 7/2008 | Podella | C11D 3/38 530/350 |
| 2009/0029879 | A1 * | 1/2009 | Soni | C09K 8/582 507/201 |
| 2010/0047793 | A1 * | 2/2010 | Toledo | C12P 5/023 435/243 |
| 2011/0030956 | A1 * | 2/2011 | Choban | E21B 43/16 166/305.1 |
| 2011/0067856 | A1 * | 3/2011 | Kohr | C12N 15/102 435/243 |
| 2011/0250582 | A1 * | 10/2011 | Gates | C09K 8/582 435/286.1 |
| 2012/0261117 | A1 * | 10/2012 | Pavia | C09K 8/582 166/246 |
| 2012/0277126 | A1 * | 11/2012 | Fallon | C09K 8/582 507/201 |
| 2012/0292022 | A1 * | 11/2012 | Choban | C10G 1/04 507/201 |
| 2013/0000912 | A1 * | 1/2013 | Hendrickson | E21B 43/16 166/305.1 |
| 2013/0062053 | A1 * | 3/2013 | Kohr | C12N 1/20 435/243 |
| 2013/0248170 | A1 * | 9/2013 | Sevinsky | C09K 8/60 166/250.01 |
| 2014/0083679 | A1 | 3/2014 | Ravnas | |
| 2014/0202684 | A1 * | 7/2014 | Danait | E21B 43/16 166/246 |
| 2014/0202685 | A1 * | 7/2014 | Danait | C09K 8/582 166/246 |
| 2014/0251622 | A1 * | 9/2014 | Coates | E21B 43/16 166/307 |
| 2014/0256055 | A1 * | 9/2014 | Pottorf | G01V 9/005 324/345 |
| 2015/0101815 | A1 * | 4/2015 | Soane | C09K 8/588 166/305.1 |
| 2015/0285051 | A1 * | 10/2015 | Miller | E21B 43/2408 166/272.3 |
| 2016/0017208 | A1 * | 1/2016 | Coates | C09K 8/58 507/274 |
| 2016/0040119 | A1 * | 2/2016 | Hashman | A01N 63/22 424/93.46 |
| 2016/0222280 | A1 * | 8/2016 | Kohr | C12N 1/26 |
| 2017/0175521 | A1 * | 6/2017 | Pirolli | E21B 49/08 |
| 2017/0175522 | A1 * | 6/2017 | Smythe | E21B 49/08 |
| 2017/0321106 | A1 | 11/2017 | Ravnas | |
| 2018/0127937 | A1 * | 5/2018 | Haeckel | E21B 43/164 |
| 2018/0163120 | A1 * | 6/2018 | Ravnås | C12N 1/22 |
| 2019/0002753 | A1 * | 1/2019 | Wilson | C09K 8/68 |
| 2019/0264091 | A1 | 8/2019 | Vorderbruggen et al. | |
| 2020/0123885 | A1 | 4/2020 | Yamamoto et al. | |
| 2020/0157408 | A1 * | 5/2020 | Farmer | C09K 8/582 |
| 2021/0179925 | A1 * | 6/2021 | Farmer | E21B 43/16 |
| 2022/0341301 | A1 * | 10/2022 | Yamamoto | E21B 43/16 |

FOREIGN PATENT DOCUMENTS

| | | |
|---|---|---|
| CN | 108761044 A | 11/2018 |
| CN | 110809661 A | 2/2020 |
| JP | 56-85284 | 7/1981 |
| JP | 2014-231711 | 12/2014 |
| JP | 2019-011612 | 1/2019 |
| WO | 2010/130712 A1 | 11/2010 |

OTHER PUBLICATIONS

Chinese Office Action dated Mar. 6, 2024 issued in corresponding Chinese application No. 202180020045.3; English translation included (15 pages).

Zhang, You-Long; Yang, Ping; "Research progress in microorganism improving soil properties", Institute of Microbiology, CAS; vol. 41, No. 10, pp. 2122-2127; Oct. 20, 2014 (6 pages).

* cited by examiner

| CULTURE MEDIUM | NAME OF CULTURE MEDIUM | ACTIVE VALUE (U/L) | OD600 |
|---|---|---|---|
| MEDIUM A | STANDARD LIQUID MEDIUM | 451 | 1.790 |
| MEDIUM B | MARINE BROTH 2216e MEDIUM | 135 | 1.970 |
| MEDIUM C | TRYPTICASE SOY BROTH MEDIUM | 178 | 5.050 |
| MEDIUM D | MIXED MEDIUM | 185 | 6.340 |

HYDROCARBON RECOVERY METHOD AND HYDROCARBON RECOVERY SYSTEM

CROSS-REFERENCE TO RELATED APPLICATIONS

The present application is a continuation application of International Application number PCT/JP2021/001488, filed on Jan. 18, 2021, which claims priority under 35 U.S.C § 119(a) to Japanese Patent Application No. 2020-040256, filed on Mar. 9, 2020. The contents of these applications are incorporated herein by reference in their entirety.

BACKGROUND OF THE INVENTION

The present invention relates to a hydrocarbon recovery method and a hydrocarbon recovery system. Conventionally, a technique for recovering a composition containing hydrocarbons buried underground has been known. Japanese Unexamined Patent Application Publication No. 2019-011612 discloses a technique for recovering methane hydrate from the seabed.

When a composition containing hydrocarbons is recovered from the seabed, the seabed collapses due to the occurrence of cavities in a region where the recovered composition existed, and there is trouble with sand, in which earth and sand flowed into the hydrocarbon production well. If earth and sand flow into the production well, the production well is blocked, and hydrocarbons cannot be recovered.

In the technology described in Japanese Unexamined Patent Application Publication No. 2019-011612, as a measure to prevent earth and sand from flowing into a production well, a composition used for producing carbon dioxide or sulfate ions by microorganisms is injected into the production well to promote a deposition of calcium carbonate by microorganisms. By increasing the deposition amount of calcium carbonate using this technique, the ground where microorganisms exist nearby can be solidified. However, since it takes a long time for microorganisms to precipitate calcium carbonate, it has been sought to shorten the time until the recovery of hydrocarbons can be started.

BRIEF SUMMARY OF THE INVENTION

The present disclosure focuses on this point, and its object is to shorten a period of time until construction for restricting earth and sand from flowing into a production well of hydrocarbons is completed.

A hydrocarbon recovery method according to a first aspect of the present disclosure is a hydrocarbon recovery method for recovering a production fluid containing hydrocarbons from a production well provided in ground in which Type 1 microorganisms that produce a biological membrane (biofilm) and Type 2 microorganisms that produce carbon dioxide for promoting deposition of calcium carbonate exist, the hydrocarbon recovery method including: injecting, into the production well, a culture medium for increasing the Type 1 microorganisms; injecting, into the production well, a composition used for producing carbon dioxide by the Type 2 microorganisms; decompressing an inside of the production well after the culture medium and the composition are injected; and recovering the hydrocarbons after lowering internal pressure of the production well.

A hydrocarbon recovery system according to a second aspect of the present disclosure is a hydrocarbon recovery system for recovering a production fluid containing hydrocarbons from a production well provided in ground in which Type 1 microorganisms that produce a biological membrane (biofilm) and Type 2 microorganisms that produce carbon dioxide for promoting deposition of calcium carbonate exist; the hydrocarbon recovery system including: a first injection part that injects, into the production well, a culture medium for increasing the Type 1 microorganisms; a second injection part that injects, into the production well, a composition used for producing carbon dioxide by the Type 2 microorganisms; a decompression part that decompresses an inside of the production well after the culture medium and the composition is injected; and a recovery part that recovers the hydrocarbons after lowering internal pressure of the production well.

DETAILED DESCRIPTION OF THE INVENTION

Hereinafter, the present invention is described through the exemplary embodiment but the undermentioned embodiment does not limit the invention according to the claims, and all of the combinations of characteristics described in the embodiment are not necessarily essential for a solution of the invention.

[Outline of a Hydrocarbon Recovery Method]

Figure 1:
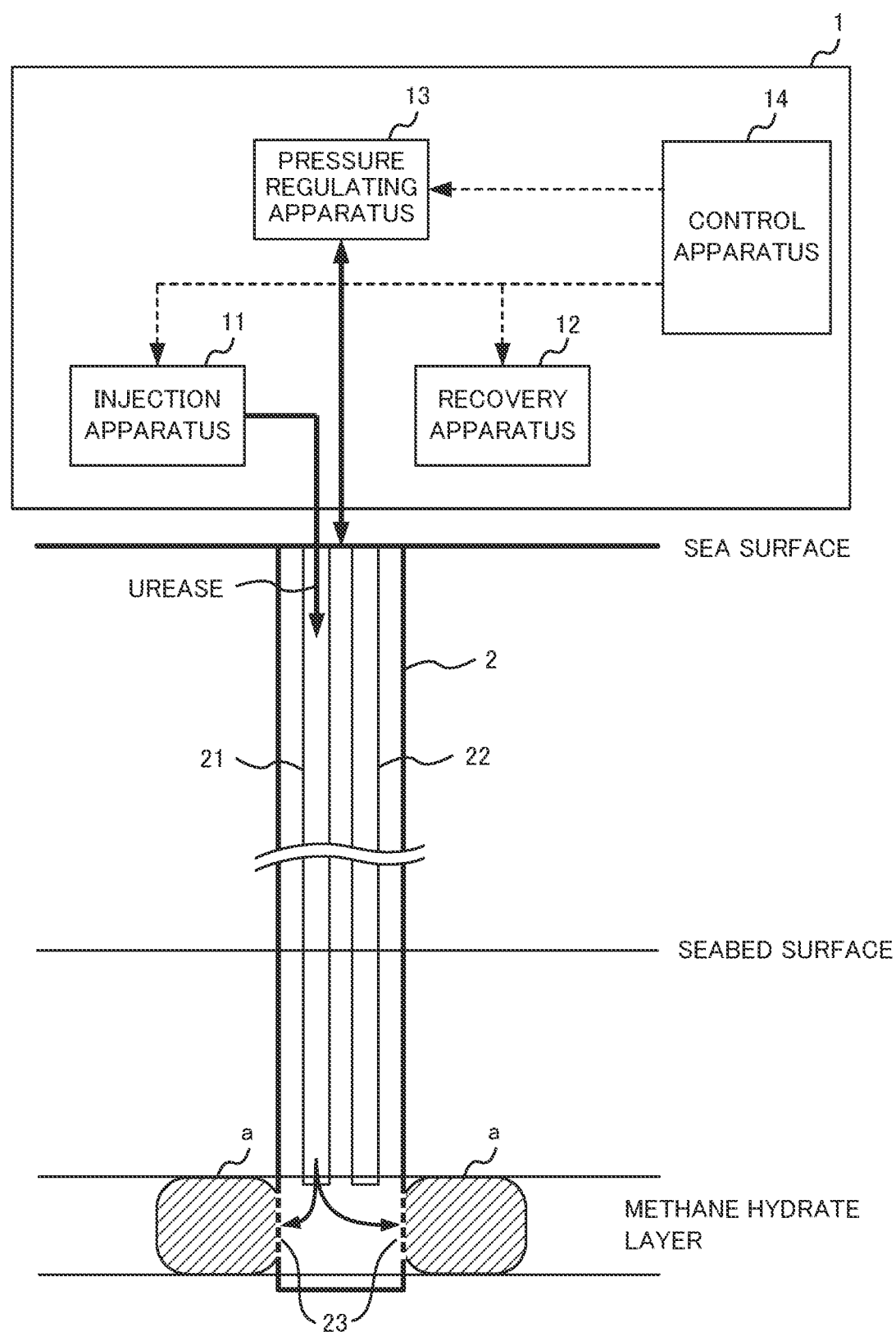
FIG. 1 illustrates an outline of a hydrocarbon recovery method of an embodiment.
Figure 2:
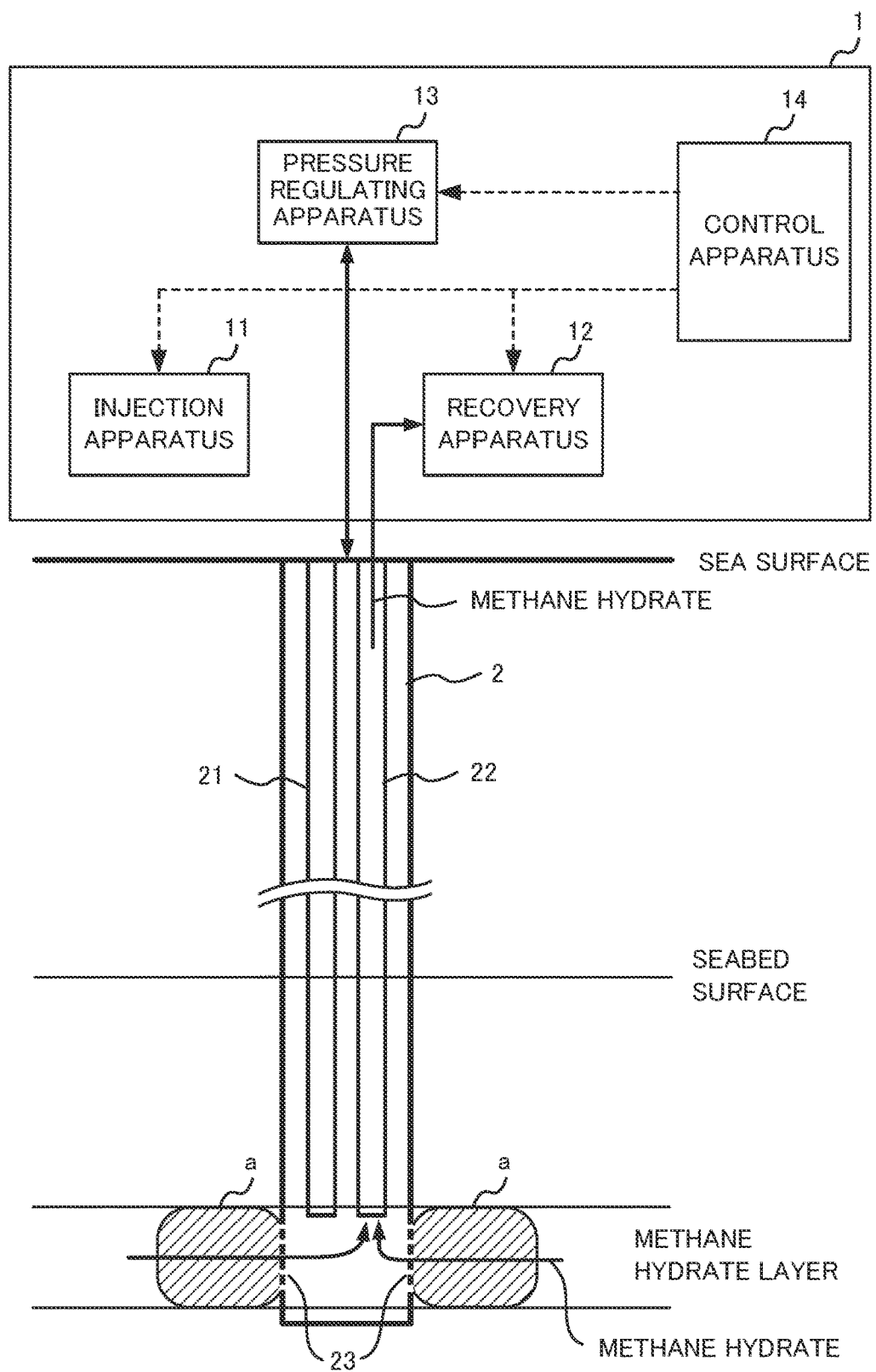
FIG. 2 illustrates the outline of the hydrocarbon recovery method of the embodiment.

FIGS. 1 and 2 are each a diagram illustrating an outline of a hydrocarbon recovery method of the present embodiment. In FIGS. 1 and 2, a hydrocarbon recovery system 1 and a production well 2 are shown.

The hydrocarbon recovery system 1 is a system for recovering a production fluid containing hydrocarbons. The hydrocarbon recovery system 1 is an apparatus for recovering, for example, methane hydrate, natural gas, or petroleum as hydrocarbons contained in the seabed. The hydrocarbon recovery system 1 is mounted on a ship for recovering methane hydrate, for example. Hereinafter, a case where hydrocarbon is methane hydrate will be mainly described as an example.

The hydrocarbon recovery system 1 includes an injection apparatus 11, a recovery apparatus 12, a pressure regulating apparatus 13, and a control apparatus 14. The control apparatus 14 is a computer that controls the injection apparatus 11, the recovery apparatus 12, and the pressure regulating apparatus 13. The control apparatus 14 executes a process for recovering hydrocarbons by executing programs stored in a storage medium or based on an operator's operation.

The production well 2 is a well for recovering the methane hydrate buried in a methane hydrate layer in the seabed. The production well 2 includes (i) an injection pipe 21 for injecting various substances used to prevent the earth and sand contained in the seabed from flowing into the production well 2, (ii) a recovery pipe 22 for recovering the methane hydrate, and (iii) an opening part 23.

The hydrocarbon recovery method of the present embodiment is characterized in that a biological membrane (biofilm) is produced on microorganisms that exist in the seabed in order to prevent the earth and sand contained in the seabed from flowing into the production well 2. In the seabed, there are (i) microorganisms (hereinafter, referred to as "Type 1 microorganisms") that produce the biological membrane and (ii) microorganisms (hereinafter, referred to as "Type 2 microorganisms") that produce carbon dioxide for promoting deposition of calcium carbonate.

The hydrocarbon recovery method of the present embodiment promotes production of the biological membrane and calcium carbonate by performing (i) a first injecting step of injecting a culture medium for increasing the Type 1 microorganisms into the production well 2 and (ii) a second injecting step of injecting a composition used for producing carbon dioxide by the Type 2 microorganisms into the production well 2. As a result, the earth and sand in a region "a" near the opening part 23 in the methane hydrate layer shown in FIGS. 1 and 2 can be solidified.

According to the present hydrocarbon recovery method, by solidifying the earth and sand in the region "a" using not only calcium carbonate but also the biological membrane, it is possible to restrict the earth and sand from flowing into the hydrocarbon production well while keeping a deposition amount of calcium carbonate within a predetermined range. It is easy for the ground to return to its original state after the recovery of the methane hydrate is completed when the earth and sand is solidified by the biological membrane. Therefore, it is possible to reduce damage to the environment as compared to the case of increasing the amount of calcium carbonate to be produced. Further, by solidifying the earth and sand in the region "a" by using not only calcium carbonate but also the biological membrane, it is possible to shorten the time until the earth and sand solidifies. Hereinafter, configurations and operations of the hydrocarbon recovery system 1 used for implementing the hydrocarbon recovery method will be described in detail.

[Configuration of the Hydrocarbon Recovery System 1]

Figures 3, 4:
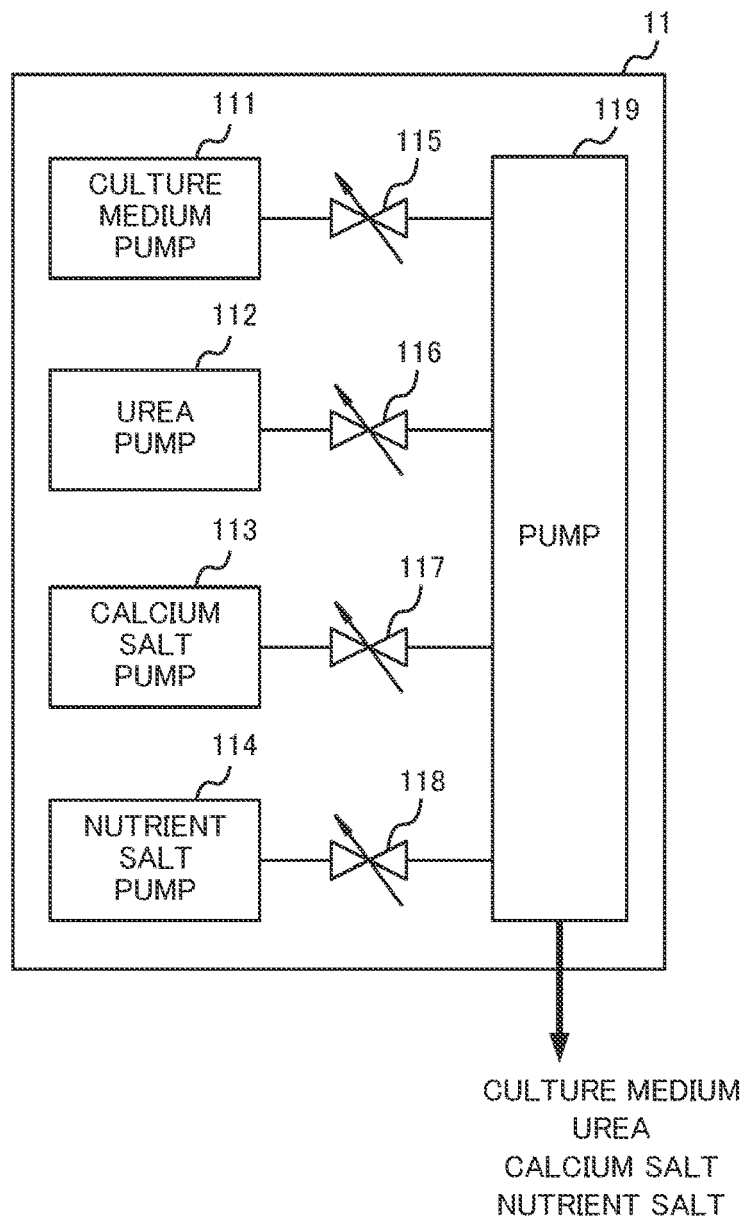
FIG. 3 shows a configuration of an injection apparatus.
FIG. 4 is a table showing examples of culture mediums used to activate Type 1 microorganisms.

FIG. 3 shows a configuration of the injection apparatus 11. Hereinafter, a method of recovering hydrocarbons by the hydrocarbon recovery system 1 will be described with reference to FIGS. 1 to 3.

The injection apparatus 11, as shown in FIG. 1, is an apparatus that, before recovering the methane hydrate, injects a composition, which is necessary for preventing earth and sand from flowing into the production well 2, into the production well 2 through the injection pipe 21. The injection apparatus 11 functions as (i) a first injection part that injects the culture medium for increasing the Type 1 microorganisms into the production well 2 and (ii) a second injection part that injects the composition used for producing carbon dioxide by the Type 2 microorganisms into the production well 2.

As shown in FIG. 3, the injection apparatus 11 includes a culture medium tank 111, a urea tank 112, a calcium salt tank 113, a nutrient salt tank 114, a valve 115, a valve 116, a valve 117, a valve 118, and a pump 119. The culture medium tank 111 is a tank for storing a culture medium to be injected into the production well 2. The urea tank 112 is a tank for storing the urea to be injected into the production well 2. The calcium salt tank 113 is a tank for storing the calcium salt to be injected into the production well 2. The nutrient salt tank 114 is a tank for storing the nutrient salt to be injected into the production well 2.

The valve 115 is a valve for adjusting an amount of the culture medium stored in the culture medium tank 111 to be injected into the production well 2 under the control of the control apparatus 14. The valve 116 is a valve for adjusting an amount of the urea stored in the urea tank 112 to be injected into the production well 2 under the control of the control apparatus 14. The valve 117 is a valve for adjusting an amount of the calcium salt stored in the calcium salt tank 113 to be injected into the production well 2 under the control of the control apparatus 14. The valve 118 is a valve for adjusting an amount of the nutrient salt stored in the nutrient salt tank 114 to be injected into the production well 2 under the control of the control apparatus 14. The pump 119 is a pump for forcing the culture medium, urea, calcium salt, and nutrient salt into the production well 2.

By injecting a culture medium suitable for Type 1 microorganisms derived from an MH-bearing layer into the production well 2 and adding the culture medium to the ground, the injection apparatus 11 increases an activity value of the Type 1 microorganisms that produce the biological membrane, for example. The culture medium to be injected into the production well 2 by the injection apparatus 11 is a culture medium containing at least any of a Marine Broth 2216e medium or a Trypticase Soy Broth medium, for example. The composition to be injected into the production well 2 by the injection apparatus 11 is a composition used for producing carbon dioxide by Type 2 microorganisms, having urease activity, which produce carbon dioxide for promoting deposition of calcium carbonate and hydrolyze urea. The composition is, for example, urea.

FIG. 4 is a table showing examples of culture mediums used for activating the Type 1 microorganisms. A culture medium A is a standard liquid medium with an active value of 451 (U/L) and an OD600 (turbidity) of 1.790. A culture medium B is a Marine Broth 2216e medium with an active value of 135 (U/L) and an OD600 of 1.970. A culture medium C is a Trypticase Soy Broth medium with an active value of 178 (U/L) and an OD600 of 5.050. A culture medium D is a medium obtained by mixing the same amount of the Marine Broth 2216e medium and the Trypticase Soy Broth medium, and has an activity value of 185 (U/L) and an OD600 of 6.340. As can be seen from the OD600 values of the culture medium C and the culture medium D, it is preferable to use the culture medium C and the culture medium D.

First, the injection apparatus 11 injects at least any of the Trypticase Soy Broth medium or the Marine Broth 2216e medium into the production well 2. The injection apparatus 11 waits until a period, in which the Type 1 microorganisms increases, since at least any of the Trypticase Soy Broth medium or the Marine Broth 2216e medium has been injected into the production well 2, has passed, and then injects urea, which is an example of the composition used by the Type 2 microorganisms to produce carbon dioxide, into the production well 2. The injection apparatus 11 waits until a period, in which a biological membrane is produced by the Type 1 microorganism, since at least any of the Trypticase Soy Broth medium or the Marine Broth 2216e medium has been injected into the production well 2, has passed, and then injects the urea, which is an example of the composition used by the Type 2 microorganisms to produce carbon dioxide, into the production well 2.

A period from when the injection apparatus 11 injects the culture medium stored in the medium tank 111 into the production well 2 until the urea stored in the urea tank 112 is injected into the production well 2 is, for example, a predetermined period previously determined by experiment. The injection apparatus 11 may determine that the predetermined period has passed when it is determined that the Type 1 microorganisms have been increased to a predetermined amount on the basis of a result of monitoring the inside of the production well 2 or when it is determined that a predetermined amount of biological membrane has been produced.

The injection apparatus 11 may further inject, together with urea, a composition containing calcium salt necessary for producing calcium carbonate into the production well 2. The composition containing the calcium salt is calcium chloride, calcium acetate, or calcium nitrate, for example. Further, the injection apparatus 11 may further inject nutrient salt which is absorbed by the Type 2 microorganisms to become nutrients for the Type 2 microorganisms and activates the Type 2 microorganisms. The injection of the nutrient salt by the injection apparatus 11 in this manner enables the Type 2 microorganisms to hydrolyze urea even in the seabed where the nutrients for the Type 2 microorganisms are poor.

The recovery apparatus 12 functions as a recovery part for recovering methane hydrate from the production well 2, and has a pump (not shown) for sucking methane hydrate. Under the control of the control apparatus 14, the recovery apparatus 12 starts the recovery of hydrocarbons (e.g., methane hydrate) after a predetermined time has passed since the injection apparatus 11 injected (i) the culture medium for activating the Type 1 microorganisms and (ii) urea for promoting deposition of calcium carbonate by carbon dioxide produced by the Type 2 microorganisms. The predetermined time is, for example, a period of time determined in advance by experiments, simulations, or the like as a time required for the deposition of calcium carbonate due to a reaction between (i) the calcium salt present in the seabed and (ii) the carbon dioxide produced by hydrolysis of urea by the microorganisms having urease activity.

In this way, the recovery apparatus 12 can recover the methane hydrate in a state in which the earth and sand in the region "a" near the production well 2 in the methane hydrate layer, which is an example of a layer capable of recovering hydrocarbons, are solidified. As a result, since the earth and sand do not flow into the production well 2 while the recovery apparatus 12 recovers the methane hydrate, the recovery efficiency of the methane hydrate can be improved.

The pressure regulating apparatus 13 is an apparatus for regulating pressure inside the production well 2 under the control of the control apparatus 14. The pressure regulating apparatus 13 functions as a decompression part that decompresses the inside of the production well 2 in order to move microorganisms existing in the seabed toward the side of the production well 2, or decompresses the inside of the production well 2 in order to recover the methane hydrate, for example.

The opening part 23 is a mesh-like area provided at a position near a tip of the injection pipe 21 on a wall surface of the production well 2. The urea injected through the injection pipe 21 is injected into the seabed from the recovery pipe 22, and the urea is absorbed by the microorganisms in the seabed. It is preferable that the opening part 23 is provided in a part of the seabed around the production well 2 that has high water permeability. In this way, the urea can be preferentially injected into the ground where the probability of the earth and sand flowing into the production well 2 is high, and therefore the ground where the probability of the earth and sand flowing into the production well 2 is high can be solidified efficiently.

[Method for Promoting Solidification of the Seabed]

In the hydrocarbon recovery method, the following steps may be executed in order to promote solidification of the seabed.

(1) Injecting Nutrient Salt

The hydrocarbon recovery method may further include a step of injecting the nutrient salt serving as the nutrients for the microorganisms to activate the hydrolysis of urea by the microorganisms. The nutrient salt is, for example, yeast extract. Injecting nutrient salt suitable for the Type 1 microorganisms with the injection apparatus 11 makes it possible to preferentially activate the Type 1 microorganisms having a high ability to produce the biological membrane. In addition, injecting nutrients suitable for the Type 2 microorganisms with the injection apparatus 11 makes it possible to preferentially activate the microorganisms having a high ability to hydrolyze urea.

(2) Injecting Microorganisms

The hydrocarbon recovery method may further include an injecting step of injecting the Type 1 microorganisms capable of producing the biological membrane or an injecting step of injecting the Type 2 microorganisms having urease activity to increase the amount of the carbon dioxide used for the deposition of calcium carbonate. In order to inject these microorganisms, the hydrocarbon recovery method may further include a step of culturing the microorganisms to be injected into the production well 2 in an anaerobic environment where water recovered from the production well 2 exists, which is executed prior to the injecting step of injecting the Type 1 microorganisms or the injecting step of injecting the Type 2 microorganisms. In the step of culturing the microorganisms, microorganisms having the same genetic information as that of the microorganisms having high activity in the seabed are preferentially cultured. By injecting the microorganisms cultured in this manner into the production well 2, the production amount of the biological membrane by the prioritized microorganisms and the deposition amount of calcium carbonate increase.

[Process of the Hydrocarbon Recovery Method]

Figure 5:
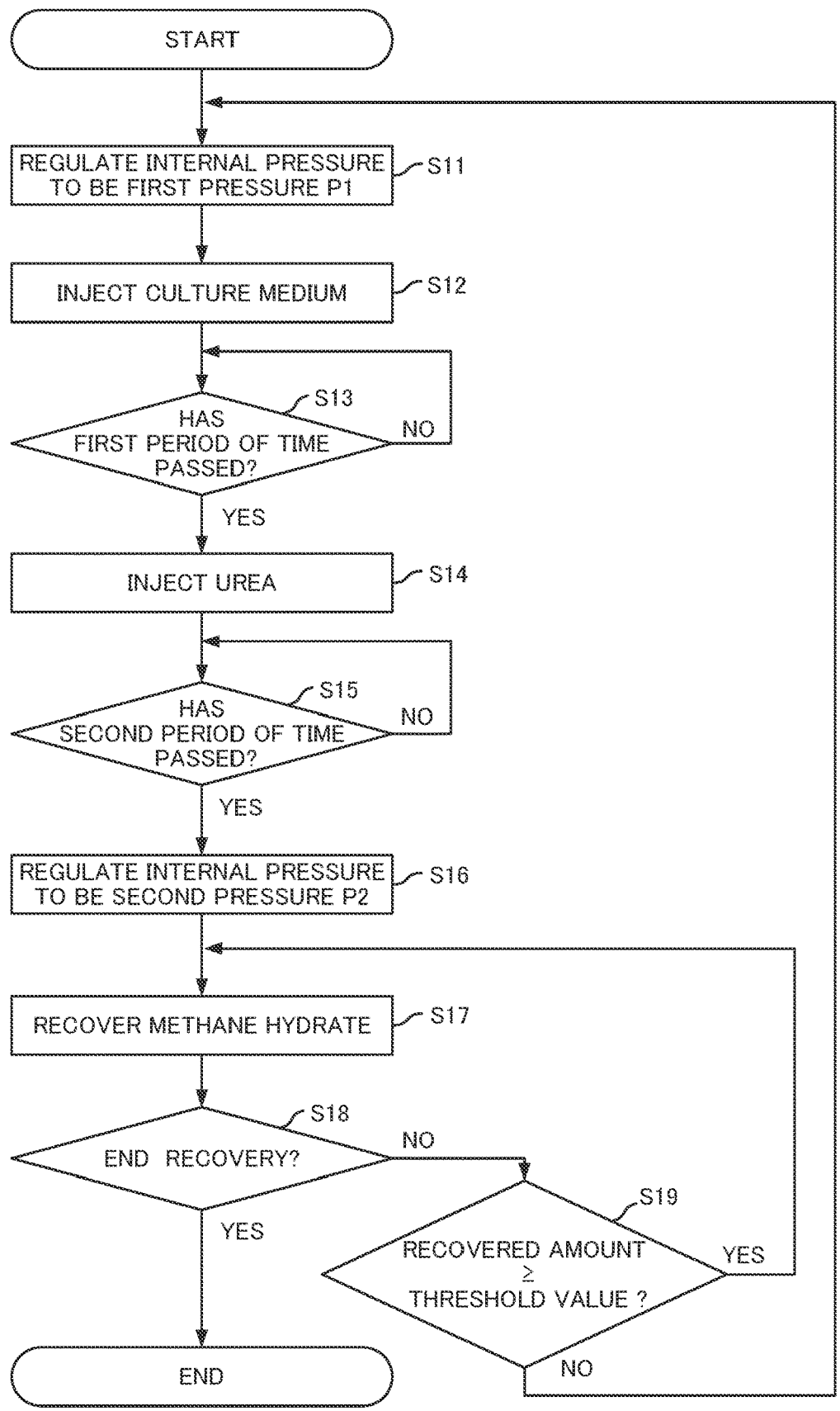
FIG. 5 is a flowchart showing a process of the hydrocarbon recovery method.

FIG. 5 is a flowchart showing a process of the hydrocarbon recovery method. First, by controlling the pressure regulating apparatus 13, the control apparatus 14 regulates the internal pressure of the production well 2 to be the first pressure P1 in order to move the microorganisms in the seabed toward the side of the production well 2 (step S11). As the amount of the Type 1 microorganisms and the Type 2 microorganisms existing in the region "a" near the production well 2 increases, the production amount of the biological membrane and the deposition amount of calcium carbonate in the region "a" increase. Therefore, the hydrocarbon recovery system 1 can more effectively prevent the earth and sand from flowing into the production well 2 by lowering the internal pressure of the production well 2 to the first pressure P1.

Next, by controlling the injection apparatus 11, the control apparatus 14 executes the first injecting step of injecting the culture medium for activating the Type 1 microorganisms into the production well 2 (S12). Thereafter, the control apparatus 14 waits until the first period of time required for the Type 1 microorganisms to produce a sufficient amount of biological membrane passes (S13).

When the first period of time has passed (YES in S13), the control apparatus 14 executes the second injection step of injecting the urea into the production well 2 by controlling the injection apparatus 11 (S14). When the urea is injected by the injection apparatus 11, the Type 2 microorganisms hydrolyze the urea to produce carbon dioxide, and the calcium carbonate is deposited due to a reaction between (i) the injected calcium salt and (ii) carbonate ions based on the carbon dioxide. The control apparatus 14 waits until the second period of time necessary for depositing the calcium carbonate that corresponds to the amount of urea injected by the injection apparatus 11 passes (step S15).

When the second period of time has passed (YES in S15), the control apparatus 14 regulates the internal pressure of the production well 2 to be the second pressure P2 by controlling the pressure regulating apparatus 13 (S16). The second pressure P2 is a pressure lower than the first pressure P1, for example. If the second pressure P2 is sufficiently low, the methane hydrate present in the high-pressure environment in the seabed moves toward the side of the production well 2. The control apparatus 14 causes the recovery apparatus 12 to recover the methane hydrate that has moved toward the side of the production well 2 (step S17).

After lowering the internal pressure of the production well 2 to the second pressure P2 and starting the recovery of the methane hydrate, the control apparatus 14 determines whether or not to the recovery of the methane hydrate (S18). When the operator performs an operation to end the recovery of the methane hydrate (YES in S18), the control apparatus 14 ends the recovery of the methane hydrate.

When it is determined that the operation for completing the recovery of the methane hydrate has not been performed (NO in S18), the control apparatus 14 determines whether or not the amount of the methane hydrate to be recovered within a unit time is equal to or larger than a threshold value (S19). If the amount of the methane hydrate to be recovered within the unit time is equal to or larger than the threshold value (YES in S19), the control apparatus 14 returns to step S17 and continues the recovery of the methane hydrate.

On the other hand, if the amount of the methane hydrate to be recovered within the unit time is less than the threshold value (NO in S19), the control apparatus 14 returns processing to step S11 and repeats processing from step S11 to step S17. That is, the control apparatus 14 further recovers the methane hydrate after the culture medium and urea are injected into the production well 2. In this way, it is possible to promote the solidification of the seabed at the time when a cavity occurs in the seabed due to the methane hydrate being recovered from the seabed. As a result, the earth and sand can be prevented from flowing into the production well 2 even after the recovery of the methane hydrate has progressed.

It should be noted that when the amount of methane hydrate to be recovered within the unit time is less than the threshold value in step S19, the control apparatus 14 may return to step S14 instead of step S11 and inject the urea.

In addition, the control apparatus 14 may wait in a state in which water flow inside the production well 2 is restricted until a predetermined period passes since an execution of the first injecting step. The predetermined period is a period determined on the basis of an amount of the biological membrane required to be produced, and is, for example, two weeks. The control apparatus 14 reduces water flow inside the production well 2 by regulating pressure inside the production well 2 with the pressure regulating apparatus 13, for example. By reducing the water flow inside the production well 2 with the control apparatus 14, it becomes easier for the Type 1 microorganisms to produce the biological membrane.

[Verification Experiment 1]

Figure 6:
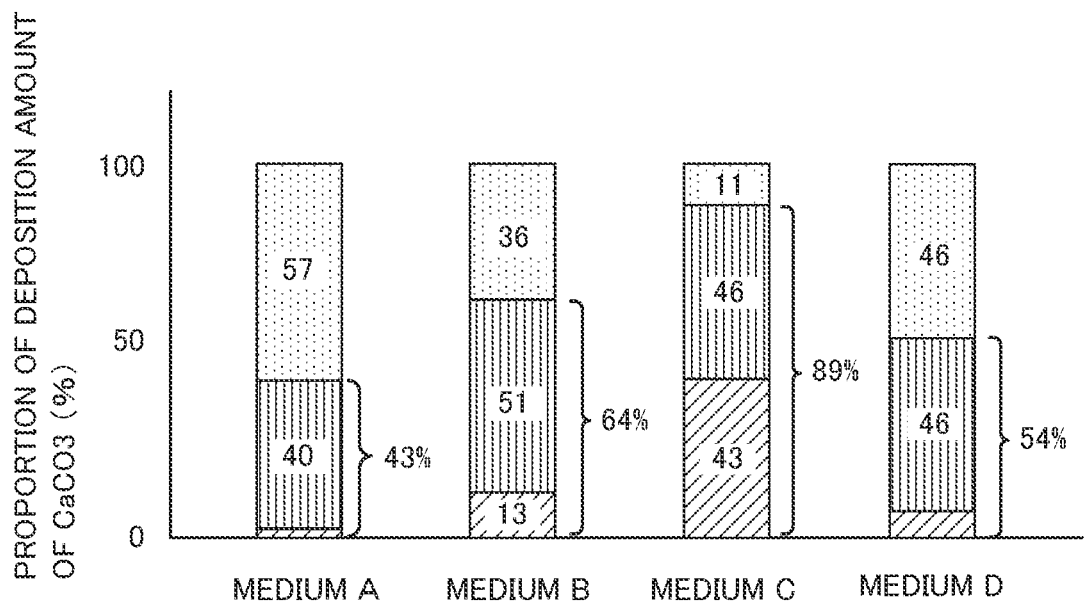
FIG. 6 shows a relationship between types of culture mediums injected into the production well by the injection apparatus and a deposition amount of calcium carbonate.

FIG. 6 is a graph showing a relationship between types of culture mediums injected into the production well 2 by the injection apparatus 11 and the deposition amount of calcium carbonate medium. The types of culture mediums correspond to a medium A, a medium B, a medium C, and a medium D shown in FIG. 4. The medium A is a standard liquid medium, the medium B is a Marine Broth 2216e medium, the medium C is a Trypticase Soy Broth medium, and the medium D is a medium in which equal amounts of the Marine Broth 2216e medium and the Trypticase Soy Broth medium are mixed.

A diagonally shaded area in FIG. 6 indicates the proportion of a deposition amount of amorphous calcium carbonate based on the biological membrane. A vertically shaded area in FIG. 6 indicates the proportion of a deposition amount of crystalline calcium carbonate. A halftone dotted area in FIG. 6 indicates the proportion of solution. According to a result shown in FIG. 6, the proportion of the deposition amount of crystalline calcium carbonate is approximately constant regardless of the culture medium. On the other hand, the proportion of the deposition amount of amorphous calcium carbonate varies depending on the culture mediums, and was largest, as 43%, when the medium C (Trypticase Soy Broth medium) is used. In this case, a total value of the proportion of amorphous calcium carbonate and the proportion of crystalline calcium carbonate is 89%.

As can be seen from FIG. 6, a ratio of the amorphous state to the crystalline state of the calcium carbonate to be deposited varies depending on the composition of the culture medium injected into the production well 2. Therefore, the control apparatus 14 may adjust the solidification intensity, the degree of the reduction in water permeability, or the like due to calcium carbonate by controlling the composition of the culture medium to be injected into the injection apparatus 11.

[Verification Experiment 2]

Figure 7:
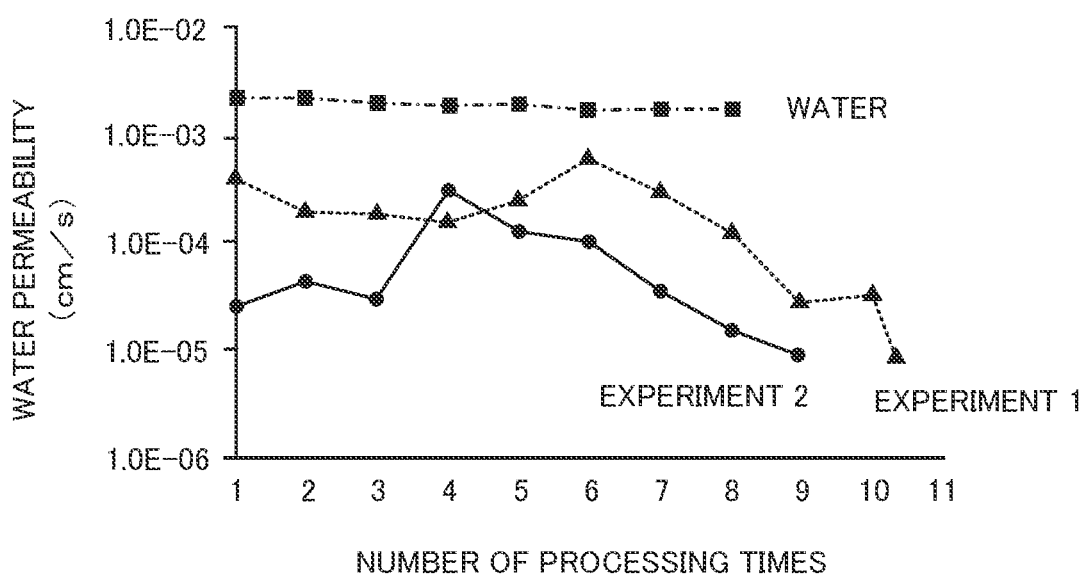
FIG. 7 shows experiment results showing an effect of injecting the culture medium into the production well.

FIG. 7 shows experiment results showing an effect of injecting the culture medium into the production well 2. The horizontal axis of FIG. 7 indicates the number of times a process of replacing water in voids is performed since the start of the experiment. The vertical axis of FIG. 7 indicates water permeability.

In FIG. 7, black squares (■) and a dashed-and-dotted line indicate changes in water permeability of the ground near the opening part 23 when the culture medium and urea are not injected into the production well 2. In FIG. 7, black triangles (▲) and a dotted line indicate changes in water permeability of the ground near the opening part 23 when the culture medium is not injected into the production well 2 and urea is injected into the production well 2. In FIG. 7, black circles (●) and a solid line indicate changes in water permeability of the ground near the opening part 23 when the culture medium and urea are injected into the production well 2. It can be confirmed from FIG. 7 that the water permeability of the ground is decreased by having the culture medium and urea injected into the production well 2.

[Verification Experiment 3]

Figure 8:
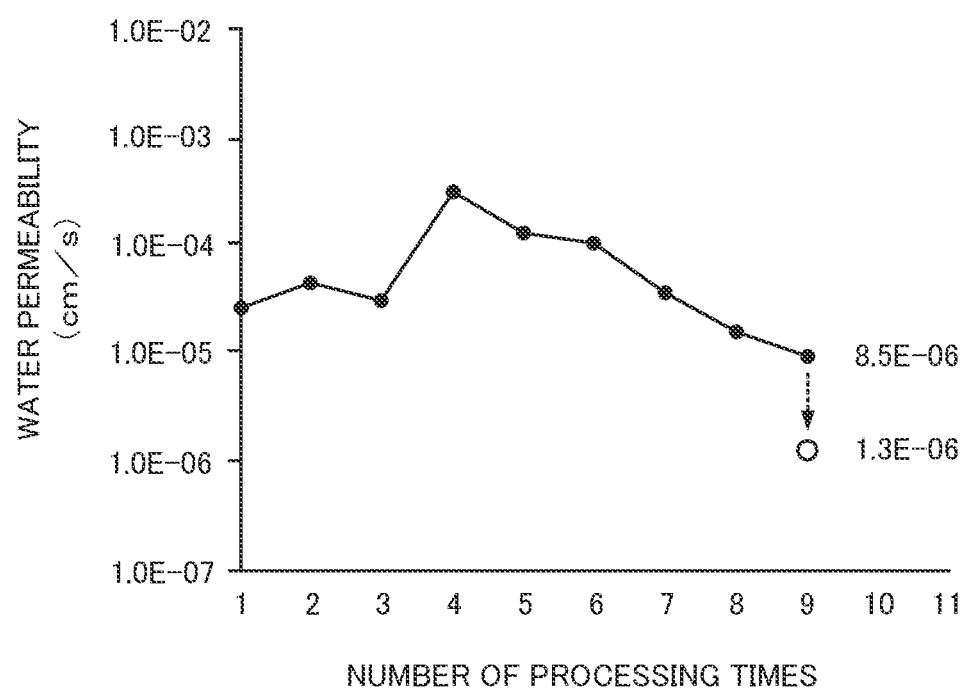
FIG. 8 shows a change in water permeability when water flow in the production well is stopped to maintain a hydrostatic state after the culture medium is added.

FIG. 8 shows a change in water permeability when water flow in the production well 2 is stopped to maintain a hydrostatic state after the culture medium is added. Circles (○) in FIG. 8 indicate the degree of water permeability after the hydrostatic state had been maintained over a predetermined period of time. By maintaining the hydrostatic state, it can be seen that water permeability was decreased to 1.3E-06 from 8.5E-06, which is the water permeability before the hydrostatic state.

[Effect of the Hydrocarbon Recovery Method]

As described above, in the hydrocarbon recovery method according to the present embodiment, the injection apparatus 11 injects the culture medium for increasing the Type 1 microorganisms and the composition used for producing carbon dioxide by the Type 2 microorganisms into the production well 2 provided in the ground where the Type 1 microorganisms that produce the biological membrane and the Type 2 microorganisms that produce carbon dioxide for promoting deposition of calcium carbonate exist. When the injection apparatus 11 injects the culture medium for increasing the Type 1 microorganisms into the production well 2, it is possible to shorten the time required for solidifying the ground near the production well 2 since the biological membrane produced by the Type 1 microorganisms contributes to solidification of the ground. As a result, it is possible to shorten the period of time until the completion of the construction for restricting the earth and sand from flowing into the production well 2 of hydrocarbons. In addition, since the ground is solidified by the biological membrane, the ground tends to return to its original state after the recovery of hydrocarbons.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A hydrocarbon recovery method for recovering a production fluid containing hydrocarbons from a production well provided in ground in which Type 1 microorganisms that are derived from an MH-bearing layer of a seabed and produce a biological membrane and Type 2 microorganisms that produce carbon dioxide for promoting deposition of calcium carbonate exist and that have a urease activity to hydrolyze urea, the hydrocarbon recovery method comprising:

injecting, into the production well, a culture medium for increasing the Type 1 microorganisms;

waiting in a state in which water flow inside the production well is restricted by regulating pressure inside the production well with the pressure regulating apparatus for regulating pressure inside the production well until a predetermined period passes since an execution of the injection of the culture medium;

injecting, into the production well, a composition used for producing carbon dioxide by the Type 2 microorganisms after having waited in a state in which water flow inside the production well has been restricted;

decompressing an inside of the production well after the culture medium and the composition are injected; and recovering the hydrocarbons after lowering internal pressure of the production well, wherein the predetermined period is a period determined on a basis of an amount of the biological membrane required to be produced.

2. The hydrocarbon recovery method according to claim 1, wherein the injecting the culture medium includes injecting at least one of a Trypticase Soy Broth medium or a Marine Broth 2216e medium into the production well.

3. The hydrocarbon recovery method according to claim 1, wherein the injecting the composition is performed after having waited until the predetermined period, in which the Type 1 microorganisms increase, has passed after the injecting the culture medium is performed.

4. The hydrocarbon recovery method according to claim 1, wherein the injecting culture medium is performed after having waited until the predetermined period, in which the biological membrane is produced by the Type 1 microorganisms, has passed after the injecting the culture medium is performed.

5. The hydrocarbon recovery method according to claim 3, further comprising waiting in the state in which water flow in the production well is restricted, until the predetermined period since the execution of the injecting the culture medium passes.

6. The hydrocarbon recovery method according to claim 1, wherein the injecting the composition includes injecting urea as the composition.

7. The hydrocarbon recovery method according to claim 6, wherein the injecting the composition includes injecting, together with the urea, calcium salt necessary for producing calcium carbonate.

8. The hydrocarbon recovery method according to claim 1, wherein the injecting the composition includes further injecting nutrient salt that activates the Type 2 microorganisms by being absorbed by the Type 2 microorganisms.

9. The hydrocarbon recovery method according to claim 1, wherein the recovering is performed after a time, which is required for a deposition of calcium carbonate due to a reaction between (i) calcium salt present in the ground and (ii) carbon dioxide produced by hydrolysis of the urea by microorganisms having urease activity present in the ground, has passed after (i) the culture medium for activating the Type 1 microorganisms is injected in the injecting the culture medium and (ii) urea as the composition is injected in the injecting the composition.

10. A hydrocarbon recovery system for recovering a production fluid containing hydrocarbons from a production well provided in ground in which Type 1 microorganisms that are derived from an MH-bearing layer of a seabed and produce a biological membrane and Type 2 microorganisms that produce carbon dioxide for promoting deposition of calcium carbonate exist and that have a urease activity to hydrolyze urea; the hydrocarbon recovery system comprising:

a first injection part that injects, into the production well, a culture medium for increasing the Type 1 microorganisms;

a pressure regulating apparatus for regulating pressure inside the production well that waits in a state in which water flow inside the production well is restricted by regulating pressure inside the production well until a predetermined period passes since an execution of the injection by the first injection part;

a second injection part that injects, into the production well, a composition used for producing carbon dioxide by the Type 2 microorganisms after the pressure regulating apparatus having waited in a state in which water flow inside the production well having been restricted;

a decompression part that decompresses an inside of the production well after the culture medium and the composition are injected; and a recovery part that recovers the hydrocarbons after lowering internal pressure of the production well, wherein the predetermined period is a period determined on a basis of an amount of the biological membrane required to be produced.

\* \* \* \* \*